United States Patent
Young et al.

(10) Patent No.: US 9,809,311 B2
(45) Date of Patent: Nov. 7, 2017

(54) MOUNTING SYSTEMS FOR PERSONAL ELECTRONIC DEVICES AND RELATED METHODS

(71) Applicant: The Boeing Company, Chicago, IL (US)

(72) Inventors: Stephen Michael Young, Mill Creek, WA (US); Carl Aaron Davison, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 84 days.

(21) Appl. No.: 14/927,919

(22) Filed: Oct. 30, 2015

(65) Prior Publication Data
US 2017/0121024 A1   May 4, 2017

(51) Int. Cl.
*H05K 7/02*   (2006.01)
*H05K 7/04*   (2006.01)
*B64D 11/00*   (2006.01)
*F16M 13/02*   (2006.01)
*H02J 7/00*   (2006.01)

(52) U.S. Cl.
CPC .... *B64D 11/0015* (2013.01); *B64D 11/00152* (2014.12); *F16M 13/02* (2013.01); *H02J 7/0042* (2013.01)

(58) Field of Classification Search
CPC .......... B64D 11/0015; B64D 11/00152; F16M 13/02; H02J 7/0042
USPC .................... 361/807, 809, 810; 16/252, 382
See application file for complete search history.

(56) References Cited

U.S. PATENT DOCUMENTS

| 5,187,744 A * | 2/1993 | Richter ............... B60R 11/0241 224/553 |
| 5,306,156 A * | 4/1994 | Gibbs .................... B60Q 1/302 224/315 |
| 8,256,712 B2 | 9/2012 | Sorensen |
| 8,727,290 B1 * | 5/2014 | De La Matta ......... F16M 11/40 248/122.1 |
| 9,097,003 B1 | 8/2015 | Sultan et al. |
| 2004/0204156 A1* | 10/2004 | Tsai .................... B60R 11/0241 455/569.1 |
| 2007/0101679 A1* | 5/2007 | Harthcock .............. B60R 13/08 52/782.1 |

(Continued)

*Primary Examiner* — Hung S Bui
(74) *Attorney, Agent, or Firm* — DASCENZO Intellectual Property Law, P.C.

(57) ABSTRACT

A mounting system may be installed in an aircraft, such as by installing a first plate and a second plate on either side of a sandwich panel wall in a personal space of an aircraft. The first plate and second plate may be coupled together, and a structural interface may receive a mounting accessory such that it is positioned adjacent the first plate. A personal electronic device may be mounted to the mounting accessory, thereby facilitating use of the personal electronic device on-board the aircraft. Such a mounting system may facilitate the use of personal electronic devices in lieu of costly in-flight entertainment systems. The first plate and second plate may be secured to a honeycomb core sandwich panel, such that fasteners may extend through inserts extending through the core, thereby distributing the weight of the personal electronic device and mounting accessory via the first plate and second plate.

20 Claims, 5 Drawing Sheets

(56) References Cited

U.S. PATENT DOCUMENTS

| | | | | |
|---|---|---|---|---|
| 2012/0318937 A1* | 12/2012 | Carnevali | ............ | F16M 11/041 248/122.1 |
| 2014/0290851 A1* | 10/2014 | Takagi | .................... | B29C 73/12 156/306.6 |
| 2015/0188357 A1* | 7/2015 | Chen | ........................ | H02J 7/025 320/108 |
| 2015/0380969 A1* | 12/2015 | Malmberg | .............. | H02J 7/025 320/108 |

* cited by examiner

MOUNTING SYSTEMS FOR PERSONAL ELECTRONIC DEVICES AND RELATED METHODS

FIELD

The present disclosure relates to mounting systems for personal electronic devices and related methods.

BACKGROUND

Personal spaces, such as crew rest areas, are often provided on aircraft, such as to allow crew members to rest when their shift has been completed. Within these personal spaces, many airlines provide entertainment options such as built-in audio listening ports, video monitors, controllers, and charging ports. However, the cost of providing in-flight entertainment is relatively high, and maintenance of these built-in entertainment systems is also costly, due to the need to replace such systems with relative frequency due to technological obsolescence. Furthermore, in-flight entertainment systems generally are not customizable to crew or passenger preferences.

SUMMARY

Presently disclosed mounting systems and related methods may facilitate use of personal electronic devices on aircraft in a manner that is comfortable for the user, aesthetically appealing, and structurally secure. Such uses may include a crew member using his or her own personal electronic device within a personal space of the aircraft, and/or may include mounting a personal electronic device within the aircraft for commercial use, such as for facilitating communication or taking orders from passengers. Facilitating use of a crew member's or passenger's own personal electronic device configured for their individual preferences may advantageously improve their experience, as compared to using uniform, generally non-customizable standard in-flight entertainment systems.

One example of a mounting system may include a sandwich panel and a structural portion coupled to the sandwich panel. The sandwich panel may include a first surface, a second surface opposite the first surface, and a core extending between the first surface and the second surface. The structural portion may include a first plate having a first outer surface and a first inner surface opposite the first outer surface and a second plate having a second outer surface and a second inner surface opposite the second outer surface. The structural portion may be coupled to the sandwich panel such that the first plate is coupled to the first surface of the sandwich panel, with the first inner surface facing the first surface of the sandwich panel, and such that the second plate is coupled to the second surface of the sandwich panel, with the second inner surface facing the second surface of the sandwich panel. Thus, the second plate may be coupled with respect to the first plate such that a portion of the sandwich panel is positioned therebetween. The structural portion may also include a structural interface configured to receive a mounting accessory for a personal electronic device such that the mounting accessory is positioned adjacent the first plate.

Presently disclosed methods may include providing the structural portion of the mounting system, coupling the first plate to the first surface of the sandwich panel, and coupling the second plate to the second surface of the sandwich panel. In some methods, a personal electronic device may be mounted to the structural portion of the mounting system (e.g., to the mounting accessory), and may be used by a crew member on the aircraft. In some methods, the mounting accessory may be selectively removable and interchangeable, such that the mounting accessory may be removed from the structural interface of the mounting system, and a different mounting accessory may be coupled to the structural interface, such as to receive a different personal electronic device.

DESCRIPTION

Figure 1:
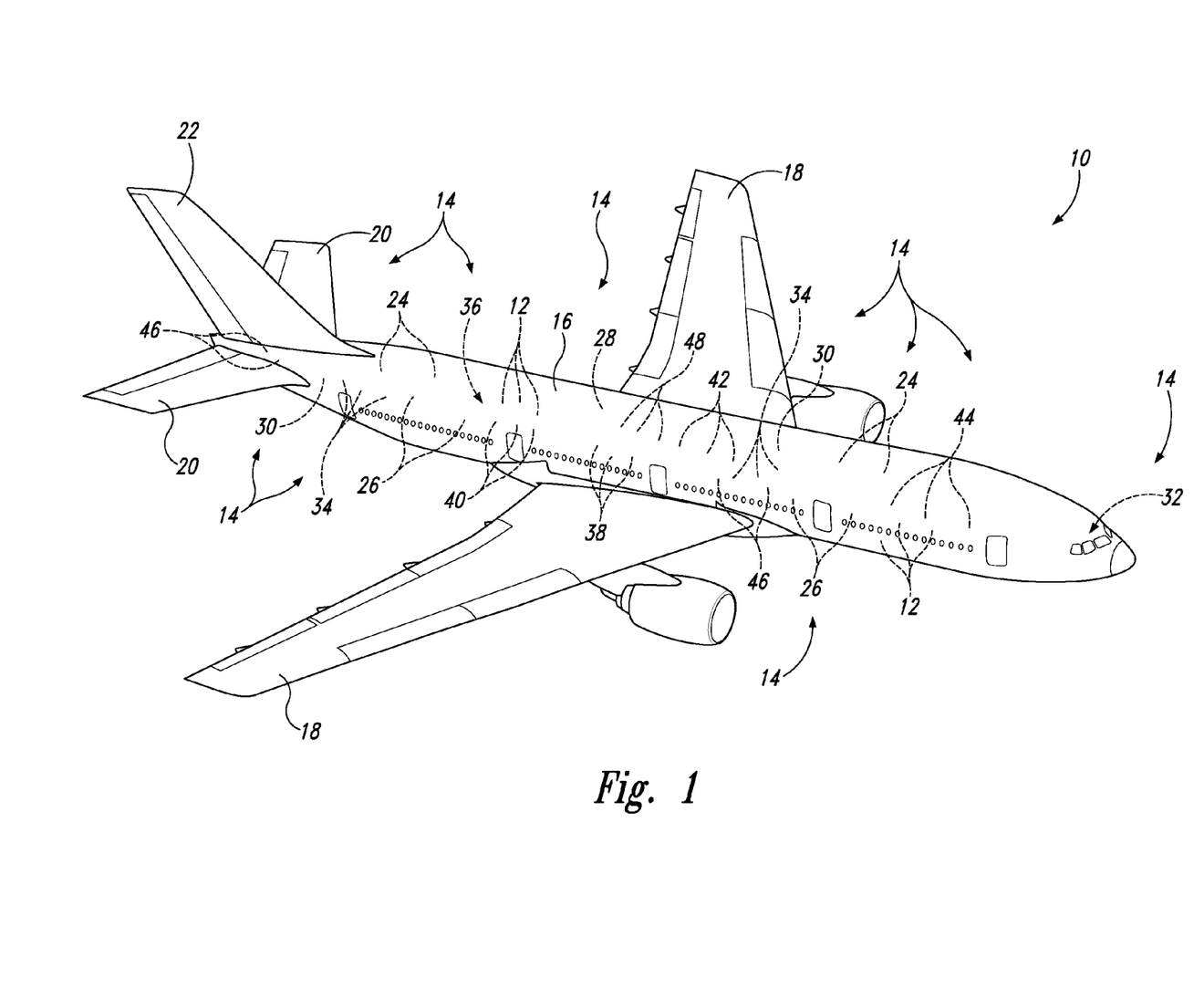
FIG. 1 is perspective, schematic view of illustrative, non-exclusive examples of an aircraft that may include one or more mounting systems or kits according to the present disclosure.

Mounting systems for personal electronic devices and related methods are disclosed herein. In FIG. 1, an example of an aircraft 10 that may include one or more mounting systems 12 provided in a personal space 14 within aircraft 10. Presently disclosed mounting systems 12 may be configured to allow crew members and/or passengers to mount their own personal electronic devices in a comfortable, aesthetically pleasing, and structurally secure manner, for use of the personal electronic device while on aircraft 10. Aircraft 10 is shown in the form of a fixed wing aircraft, but other types and configurations of aircraft are within the scope the present disclosure, including (but not limited to) helicopters.

Aircraft 10 may include a fuselage 16, which generally corresponds to the main body of aircraft 10 for holding passengers, crew, cargo, and/or equipment, for example, depending on the particular configuration and/or function of an aircraft 10. Typically, although not required, the fuselage 16 of an aircraft 10 is elongate and somewhat cylindrical or tubular. Aircraft 10 also may include wings 18, horizontal stabilizers 20, and a vertical stabilizer 22, each of which may be constructed as a unitary structure or in subsections that are subsequently assembled together. Within fuselage 16, aircraft 10 may include one or more personal spaces 14, such as one or more crew rests 24, lavatories 26, private suites 28, galley areas 30, and/or a cockpit 32. Aircraft 10 may include one or more interior monuments 34 within such personal spaces 14 or within fuselage 16 (e.g., within the main cabin of aircraft 10), to which presently disclosed mounting systems 12 may be coupled. Such interior monuments 34 may include a substantially vertical surface, and/or may include a portion of one or more of a main cabin 36, a passenger service unit 38, a side wall 40, a passenger seat 42, an aircraft closet 44, galley area 30, a galley cart 46, lavatory 26, cockpit 32, and crew rest 24 (e.g., a crew rest wall), each of which may be formed by or include one or more sandwich panels 48.

Figure 2:
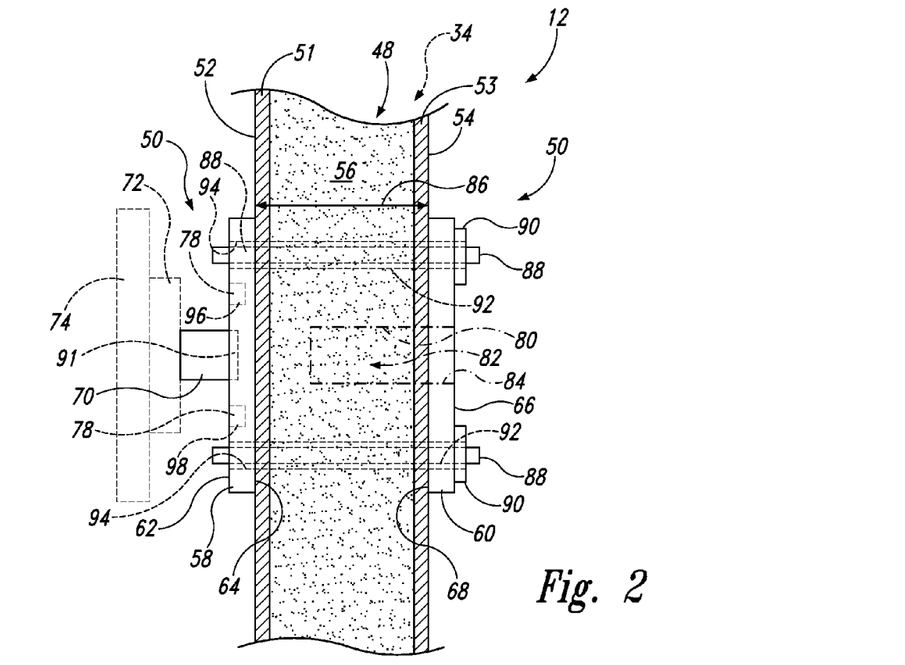
FIG. 2 is a schematic, cross-section view of illustrative, non-exclusive examples of mounting systems according to the present disclosure.

FIG. 2 illustrates a schematic view of representative, non-exclusive examples of mounting systems 12 according to the present disclosure. Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

As shown in FIG. 2, mounting system 12 may include sandwich panel 48 and a structural portion 50 coupled to sandwich panel 48. Structural portion 50 may be configured to be sufficiently structurally secure with respect to sandwich panel 48 to account for various loads (e.g., various weights of personal electronic devices that may be secured thereto, as well as loads associated with a user adjusting structural portion 50 and/or other components of mounting system 12 during use), and remain coupled to sandwich panel 48 during and after these various loads.

Sandwich panel 48 may include a first skin layer 51 having a first surface 52, a second skin layer 53 having a second surface 54, and a core 56 extending between first surface 52 and second surface 54, such that first skin layer 51 and second skin layer 53 are positioned on opposites sides of core 56 from one another. First skin layer 51 may be arranged such that first surface 52 faces outwardly and away from core 56. Similarly, second skin layer 53 may be arranged such that second surface 54 faces outwardly and away from core 56. Sandwich panel 48 may be formed of any suitable materials, having a flexible, rigid, or semi-rigid first skin layer 51, and a flexible, rigid, or semi-rigid second skin layer 53, and core 56 therebetween. Generally, first skin layer 51 and second skin layer 53 may be relatively thin sheets or plates, while core 56 may have a thickness that is significantly greater than the respective thicknesses of first skin layer 51 and second skin layer 53. In some examples, the density of core 56 may be less than that of first skin layer 51 and second skin layer 53. Sandwich panel 48 may be, for example, a honeycomb core sandwich panel, but other constructions are contemplated within the scope of the present disclosure. First skin layer 51 and second skin layer 53 may be, for example, aluminum sheets, or may be formed of one or more layers or plys of composite materials (e.g., fiber-reinforced polymers). In some examples, core 56 may be formed of a plurality of longitudinally-extending open cells of any shape, and formed of any material, such as aluminum, Nomex®, or other lightweight material. In some examples, core 56 may be formed of foamed material, or low-density materials, such as balsa wood or polystyrene.

Structural portion 50 may include a first plate 58 positioned on one side of sandwich panel 48 (e.g., adjacent first surface 52) and a second plate 60 positioned on the other side of sandwich panel 48 (e.g., adjacent second surface 54). First plate 58 may include a first outer surface 62 and a first inner surface 64 opposite first outer surface 62. First plate 58 may be positioned with respect to sandwich panel 48 such that first plate 58 is coupled to first surface 52, with first inner surface 64 of first plate 58 facing and coupled to first surface 52 of sandwich panel 48. For example, sandwich panel 48 may form a portion of an interior monument (e.g., interior monument 34) within an aircraft (e.g., aircraft 10), and first plate 58 may be coupled to first surface 52 of the interior monument such that first inner surface 64 faces first surface 52.

Similarly, second plate 60 may include a second outer surface 66 and a second inner surface 68 opposite second outer surface 66. Second plate 60 may be positioned with respect to sandwich panel 48 such that second plate 60 is coupled to second surface 54, with second inner surface 68 of second plate 60 facing second surface 54 of sandwich panel 48. Thus, second plate 60 may be coupled with respect to first plate 58 such that a portion of sandwich panel 48 is positioned therebetween. Thus, first plate 58 may be spaced apart from second plate 60 by a distance 86 when structural portion 50 is coupled to sandwich panel 48, distance 86 being defined by the thickness of sandwich panel 48. In other words, distance 86 between first plate 58 and second plate 60 may be measured between first inner surface 64 of first plate 58 and second inner surface 68 of second plate 60, substantially perpendicularly to first inner surface 64 and second inner surface 68. Distance 86 may be, for example, at least 0.10 inches (in) (0.25 centimeters (cm)), at least 0.25 in (0.64 cm), at least 0.5 in (1.27 cm), at least 0.75 in (1.91 cm), at least 1 in (2.54 cm), at least 1.5 in (3.81 cm), at least 2 in (5.08 cm), and/or greater than 2 in. Second plate 60 may be a double bracket in some examples.

Structural portion 50 of mounting system 12 may include a structural interface 70 that is configured to receive a mounting accessory 72 (e.g., mounting accessory 72 may be configured to be coupled to structural interface 70). In turn, mounting accessory 72 may be configured to receive a personal electronic device 74 and maintain personal electronic device 74 in a position relative to sandwich panel 48 (e.g., interior monument 34), wherein the position is suitable for use and/or viewing by a passenger and/or crew member adjacent sandwich panel 48. Mounting system 12 may be configured to suspend personal electronic device 74 from sandwich panel 48, thereby positioning personal electronic device 74 for use and securing it to sandwich panel 48 via structural portion 50 and mounting accessory 72 coupled thereto. In some examples, sandwich panel 48 may be substantially vertically oriented within aircraft 10. The position and orientation of personal electronic device 74 may be adjusted with respect to sandwich panel 48, such as by tilting or rotating mounting accessory 72. Furthermore, various different types of personal electronic devices 74, having different respective weights may be secured to presently disclosed mounting systems 12. Thus, mounting systems 12 may be configured to be securely coupled to sandwich panel 48 and strong enough to withstand such variable loads from different types of personal electronic devices 74, from loads associated with adjusting mounting accessory 72 or other components of structural portion 50 in order to adjust the position of personal electronic device 74, from loads associated with securing personal electronic device 74 to mounting accessory 72, from loads associated with removing or replacing mounting accessory 72, and/or from loads associated with forces and movements experienced on the aircraft.

Structural interface 70 may be formed integrally with first plate 58 in some examples. Alternatively, structural interface 70 may be removably coupled to first plate 58, such as adjacent first outer surface 62 of first plate 58. For example, structural interface 70 may be configured to receive a plurality of different types of mounting accessories 72 for a plurality of different personal electronic devices 74, where structural interface 70 may be selectively removable from first plate 58 and replaced with a different type of structural interface 70, such as to receive a different mounting accessory 72. Structural interface 70 may be removably coupled to first plate 58 (e.g., to first outer surface 62 of first plate 58) using, for example, one or more mounting floating nut plates, fasteners, adhesives, suction cups, magnets, drill plates, base plates, bolts, tracks, and/or a snap fit. In some examples, first plate 58 may include a plurality of structural interfaces 70 for receiving a plurality of respective personal electronic devices 74. In some examples, first outer surface 62 of first plate 58 itself may serve as structural interface 70.

Mounting system 12 and structural interface 70 may be configured such that mounting accessory 72 is positioned adjacent first plate 58. For example, structural interface 70 may be configured to receive mounting accessory 72 such that mounting accessory 72 is positioned adjacent first outer surface 62 of first plate 58. Structural interface 70 may project outwardly from first outer surface 62 of first plate 58 when structural interface 70 is coupled to first plate 58. Structural interface 70 may include forms such as a spherical elastomeric knob 76 (see FIG. 6), a base, a ball, a suction cup, a clamp, a screw, a clip, a base plate, a track, a groove, and/or a recess formed in first plate 58.

Mounting accessory 72 may be, for example, an adjustable mounting arm, an adjustable mounting bracket, a mounting arm, a clamp, a holder, a cradle, a grip, a socket, a spring, and/or a tripod. Mounting accessory 72 may be any structure that is configured to maintain personal electronic device 74 in a position suitable for use and/or viewing by a passenger and/or crew member on the aircraft. In some examples, mounting accessory 72 may be fitted such that it is configured to hold or receive a specific size of personal electronic device 74. In other examples, mounting accessory 72 may be adjustable such that it may be adapted to hold or receive a variety of sizes of personal electronic devices 74. Mounting accessory 72 may be moveably and/or removably coupled to structural interface 70, such as via one or more of a hinge, a ball-and-socket joint, a spring, a cord, a retractable cord, a screw, a pivot, a bearing, and a track. Mounting accessory 72 may be selectively removable from structural interface 70 such that a different type, style, and/or size of mounting accessory 72 may be coupled to structural interface 70. Any type of personal electronic device 74 may be coupled to structural interface 70 via mounting accessory 72, examples of which include a mobile telephone, a tablet, a laptop, a camera, an e-reader, a handheld computer game system, a portable media player, a smartphone, a personal digital assistant, a music player, a GPS device, and/or an MP3 player.

Mounting system 12 (e.g., structural portion 50) may include one or more charging interfaces 78 that each may be configured to charge personal electronic device 74. For example, each charging interface 78 may be a USB port, a micro-USB port, a three-prong outlet, a two-prong outlet, a Lightning port, a wireless charging interface, a headphone jack, a dock connector port, or a portable digital media interface (PDMI) port. Thus, a cable may be used to connect personal electronic device 74 to charging interface 78 such that personal electronic device 74 may be charged while in use and retained by mounting system 12. In some examples, one or more charging interfaces 78 may be positioned adjacent structural interface 50, such as on first outer surface 62 of first plate 58. In some examples, charging interface 78 may include a first charging interface 96 and a second charging interface 98, where first charging interface 96 is a different type than second charging interface 98. For example, first charging interface 96 may be a USB port, while second charging interface 98 may be a Lightning port for receiving a Lightning connector.

Sandwich panel 48 may be a portion of an interior monument 34 and/or personal space 14 (see FIG. 1) within aircraft 10. For example, first surface 52 may be a portion of an interior wall, such as side wall 40 of aircraft 10. Second surface 54 may be a portion of an exterior wall of aircraft 10. For example, mounting system 12 may be installed within a personal space 14, such as crew rest 24, such that first plate 58 is coupled to a side wall 40 inside crew rest 24, while second plate 60 is coupled to a side wall 40 outside of crew rest 24. First plate 58 and second plate 60 may be formed of any suitable materials. For example, first plate 58 may be polymeric and/or metallic. Second plate 60 may be polymeric and/or metallic. First outer surface 62 of first plate 58 may include a substantially smooth surface, such that first plate 58 may be configured to receive and retain a suction cup.

In some mounting systems 12, sandwich panel 48 may include a cut-out 80 extending through at least a portion of core 56, from second surface 54 of sandwich panel 48. Such cut-out 80 may be configured to receive a power component 82 (e.g., a wire, a cable, a power supply, a current source, a voltage source, and/or a charger). Such power component 82 may be electrically accessible from the other side of sandwich panel 48 (e.g., from first surface 52), such as via charging interface 78 in first plate 58 of structural portion 50. In this manner, a personal electronic device 74 positioned adjacent first surface 52 of sandwich panel 48 may be charged by power component 82, which may be positioned adjacent second surface 54 of sandwich panel 48. In other words, mounting system 12 may be configured such that personal electronic device 74 may be selectively electrically coupled to power component 82 via first plate 58 (e.g., via charging interface 78 formed in first plate 58). Second plate 60 may include an opening 84 that is sized and shaped to provide access to cut-out 80 formed in sandwich panel 48. For example, opening 84 may be configured to allow insertion of one or more of a wire, a cable, a power supply, and a charger therethrough, such that the same (and/or a different power component 82) may be inserted into cut-out 80 of second plate 60.

Mounting system 12 (e.g., structural portion 50 of mounting system 12) may include a plurality of fasteners 88, at least some of which may substantially fix first plate 58 with respect to second plate 60. For example, one or more fasteners 88 may couple first plate 58 to first surface 52 of sandwich panel 48. Similarly, one or more fasteners 88 may couple second plate 60 to second surface 54 of sandwich panel 48. In some examples, one or more fasteners 88 may couple first plate 58 to second plate 60. In some examples, some or all respective fasteners 88 may engage first plate 58 and second plate 60. In some examples, some or all of fasteners 88 may extend through the entire thickness of sandwich panel 48, from at least first surface 52 to second surface 54, through core 56. Fasteners 88 may include any suitable fasteners, such as pins, bolts, screws, nuts, rivets, and/or any other suitable fasteners.

Mounting system 12 (e.g., structural portion 50 of mounting system 12) may include one or more floating nut plates 90. One or more floating nut plates 90 may be coupled to first plate 58 and/or second plate 60. In some examples, one or more floating nut plates 90 may be formed integrally with first plate 58 and/or second plate 60. In one specific example, a mounting floating nut plate 91 may be coupled to first plate 58 for securement of structural interface 70 to first plate 58. In some examples, a plurality of floating nut plates 90 may be coupled to or formed integrally with second plate 60 and each respective floating nut plate 90 may be configured to engage a respective fastener 88, which may effectuate coupling second plate 60 to second surface 54 of sandwich panel 48.

Mounting system 12 (e.g., structural portion 50 of mounting system 12) may include one or more through-inserts 92 extending through core 56 of sandwich panel 48 (e.g., from first surface 52 to second surface 54 of sandwich panel 48, which may form a portion of an interior monument 34), each through-insert 92 being configured to receive a respective fastener 88 there-through. In some examples, one or more respective fasteners 88 may extend through a respective through-insert 92. For example, one or more respective fasteners 88 may be installed through first plate 58 (e.g., each respective fastener 88 may extend through a respective through-hole 94 formed in first plate 58), through a respective through-insert 92, and into a respective floating nut plate 90, thereby securing first plate 58 and second plate 60 to sandwich panel 48. Examples of mounting systems 12 may include at least two, at least three, at least four, at least five, at least six, at least seven, at least eight, at least nine, and/or at least ten through-inserts 92.

Figure 3:
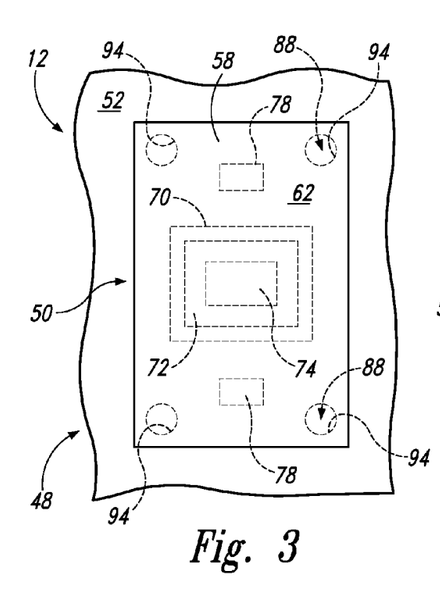
FIG. 3 is a schematic, elevation view of illustrative, non-exclusive examples of first plates of mounting systems according to the present disclosure.
Figure 4:
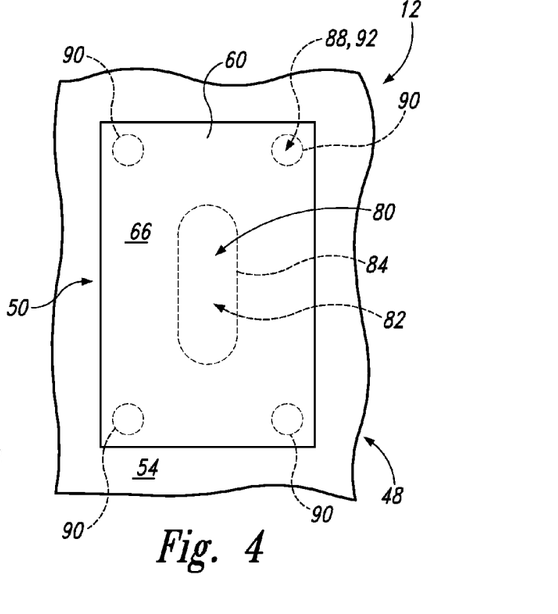
FIG. 4 is a schematic, elevation view of illustrative, non-exclusive examples of second plates of mounting systems according to the present disclosure.

FIGS. 3 and 4 schematically illustrate examples of first plates 58 (FIG. 3) and second plates 60 (FIG. 4), as coupled to first surface 52 and second surface 54, respectively, of sandwich panel 48. As shown in FIG. 3, structural interface 70 may be substantially centrally located on first plate 58, however, other locations are also possible. FIG. 3 illustrates two charging ports 78, one on either side of structural interface 70, however more or fewer charging ports 78 are also within the scope of the present disclosure. Furthermore, charging ports 78 may be positioned adjacent one another, instead of on opposite sides of structural interface 70. First plate 58 may include four through-holes 94 adjacent corners of first plate 58, as shown in FIG. 3, but any arrangement of more or fewer through-holes 94 is possible, for receiving respective fasteners 88 for coupling first plate 58 to first surface 52 of sandwich panel 48. First plate 58 is shown having a substantially rectangular shape, however any shape is possible for first plate 58, including polygonal, circular, oval, and irregular shapes. Any suitable arrangement and number of through-holes 94 and respective fasteners 88 may be used to secure first plate 58 to first surface 52 of sandwich panel 48.

Similarly, as shown in FIG. 4, opening 84 may be substantially centrally located on second plate 60, however other locations are also possible. FIG. 4 illustrates four floating nut plates 90 corresponding to respective through-holes 94 and fasteners 88 shown in FIG. 3, adjacent corners of second plate 60. Generally, second plate 60 may include any number of floating nut plates 90, in any configuration and position, such as may couple second plate 60 to second surface 54 of sandwich panel 48. In some examples, each respective floating nut plate 90 coupled to or formed integrally with second plate 60 may correspond to a respective through-hole 94 formed in first plate 58 and receive a respective fastener 88. Second plate 60 is shown having a substantially rectangular shape, however any shape is possible for second plate 60, including polygonal, circular, oval, and irregular shapes.

Figure 5:
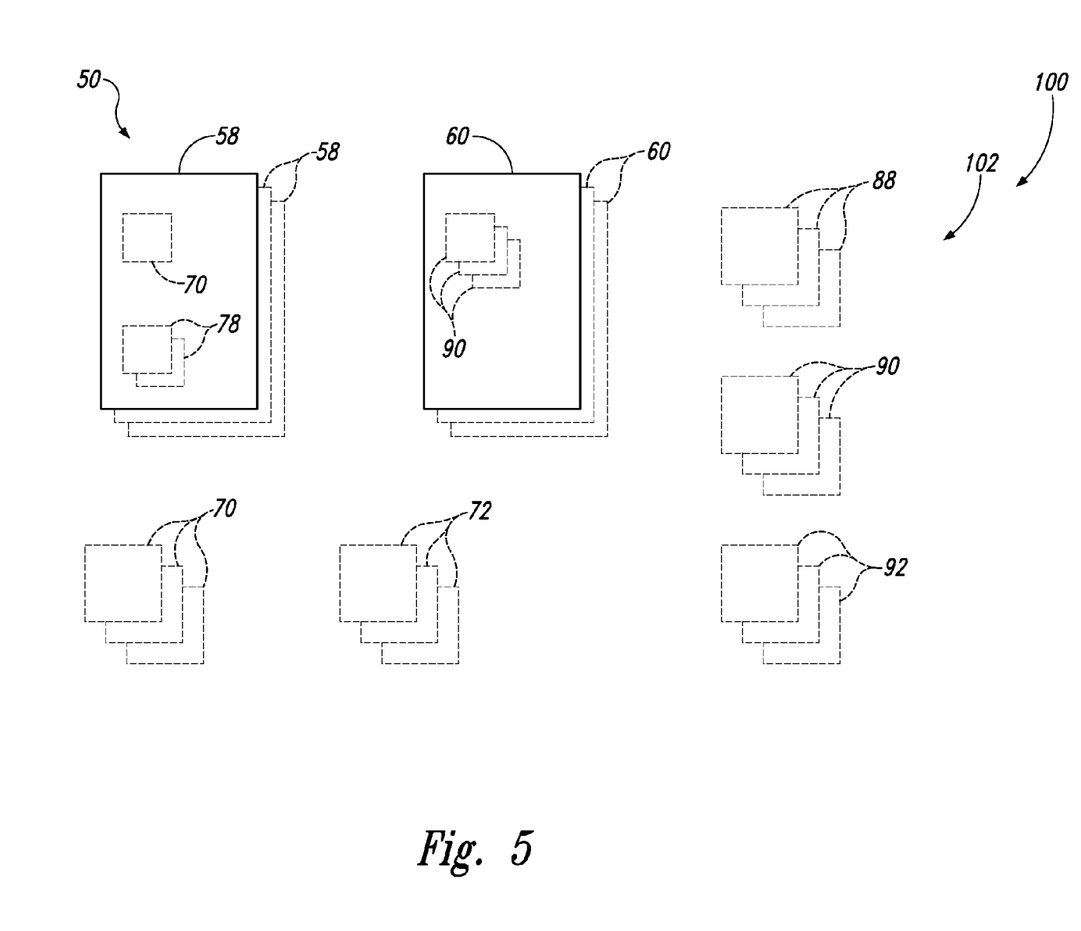
FIG. 5 is a schematic view of illustrative, non-exclusive examples of kits according to the present disclosure.

FIG. 5 illustrates a kit 100 that may include one or more structural portions 50 of a mounting system 12, and/or a family of mounting systems 102. For example, kit 100 may include first plate 58, second plate 60, and structural interface 70. Some examples of kit 100 may further include mounting accessory 72, fasteners 88, through-inserts 92, and/or floating nut plates 90. Kit 100 may be configured to be installed in an aircraft (e.g., aircraft 10, such as on an interior monument 34) such that first plate 58 and second plate 60 together are configured to support mounting accessory 72 and a personal electronic device (e.g., personal electronic device 74), kit 100 thereby being configured to suspend the personal electronic device from an interior monument (e.g., interior monument 34) within the aircraft and position the personal electronic device for use. In some examples, kit 100 may be configured to be coupled to a substantially vertical surface of an interior monument within an aircraft.

In some examples, kit 100 may include a family of mounting systems 102, which may include a plurality of first plates 58, a plurality of second plates 60, a plurality of structural interfaces 70, a plurality of mounting accessories 72, a plurality of fasteners 88, a plurality of through-inserts 92, and/or a plurality of floating nut plates 90. Each of the plurality of structural interfaces 70 may be configured to receive a respective mounting accessory 72 from the plurality of mounting accessories. One or more of the plurality of first plates 58 may be configured to receive a respective structural interface 70 from the plurality of structural interfaces. In some examples, one or more first plates 58 of the plurality of first plates may include a structural interface 70 formed integrally therewith. Each of the plurality of second plates 60 may be configured to be coupled with respect to a respective first plate 58, such that the respective first plate 58 and respective second plate 60 are positioned on either side of an interior monument within an aircraft. In some examples, first plate 58 and second plate 60 may be configured to be coupled to each other, with a portion of a sandwich panel (e.g., sandwich panel 48) or interior monument (e.g., interior monument 34) positioned therebetween.

Within family of mounting systems 102, the plurality of structural interfaces 70 may include a plurality of different types of structural interfaces 70, each different type of structural interface 70 differing in at least one of size, shape, and connectivity type from the other different types of structural interfaces 70. Additionally or alternatively, the plurality of mounting accessories 72 may include a plurality of different types of mounting accessories 72, differing from the other different types of mounting accessories 72 by size, shape, and/or connectivity type. In some examples, each respective type of structural interface 70 of the plurality of structural interfaces may correspond to a respective type of mounting accessory 72 of the plurality of mounting accessories.

In some kits 100 and/or families of mounting systems 102, one or more first plates 58 may include one or more charging interfaces 78 formed therein. In kits 100 and families of mounting systems 102 including a plurality of first plates 58, the plurality of first plates may include a plurality of different types of first plates 58, each different type of first plate 58 differing from the other different types of first plates 58 in at least one of size, shape, type of charging interface, and configuration to receive the structural interface.

Turning now to FIGS. 6-9, illustrative non-exclusive examples of mounting systems 12 are illustrated. Where appropriate, the reference numerals from the schematic illustrations of FIGS. 1-5 are used to designate corresponding parts of mounting systems 12 shown in FIGS. 6-9; however, the examples of FIGS. 6-9 are non-exclusive and do not limit mounting systems 12 to the illustrated embodiments of FIGS. 6-9. That is, mounting systems 12 are not limited to the specific embodiments of the illustrated FIGS. 6-9, and may incorporate any number of the various aspects, configurations, characteristics, properties, etc. of mounting systems 12 that are illustrated in and discussed with reference to the schematic representations of FIGS. 1-5 and/or the embodiments of FIGS. 6-9, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to FIGS. 6-9, however, it is within the scope of the present disclosure that the previously discussed features, variants, etc. may be utilized with the illustrated mounting systems 12.

Figure 6:
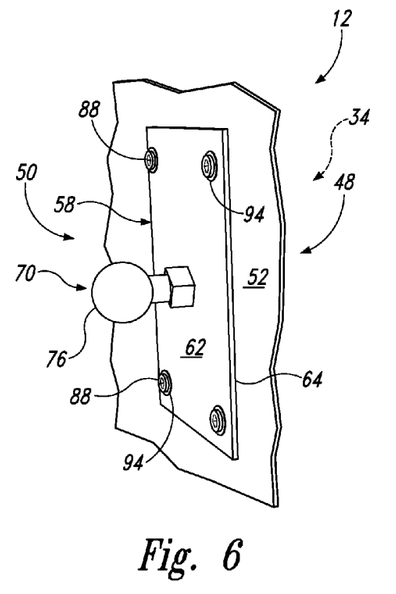
FIG. 6 is a perspective view of one example of a first plate of a mounting system according to the present disclosure.

FIG. 6 shows one example of mounting system 12, showing first plate 58 coupled to first surface 52 of an interior monument of an aircraft (e.g., sandwich panel 48), such that first inner surface 64 of first plate 58 faces first surface 52 of sandwich panel 48. Structural interface 70 is shown in the form of an elastomeric knob 76, projecting outwardly from first outer surface 62 of first plate 58. A plurality of fasteners 88 may extend through first plate 58 via through-holes 94, thereby coupling first plate 58 to first surface 52 of sandwich panel 48. Elastomeric knob 76 may be configured to receive a mounting accessory (e.g., mounting accessory 72), which in turn may be configured to mount or receive a personal electronic device (e.g., personal electronic device 74).

Figure 7:
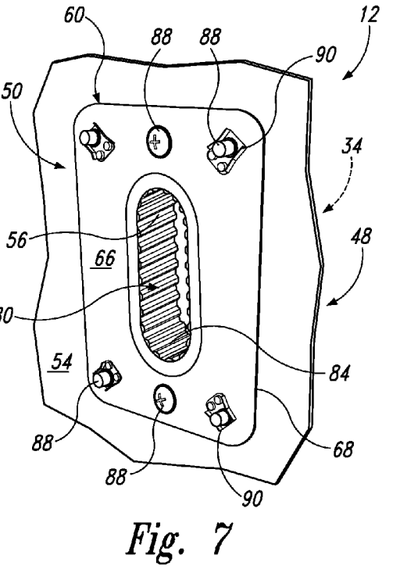
FIG. 7 is a perspective view of one example of a second plate of a mounting system according to the present disclosure.

FIG. 7 shows an example of mounting system 12, with second plate 60 coupled to second surface 54 of an interior monument of an aircraft (e.g., sandwich panel 48), such that second inner surface 68 of second plate 60 faces second surface 54 of sandwich panel 48. Fasteners 88 may couple second plate 60 to second surface 54. Additionally or alternatively, one or more floating nut plates 90 may each receive a respective fastener 88, where such fasteners may extend through a first plate of the mounting system (e.g., first plate 58), and through a core of sandwich panel 48 (e.g., core 56) via a respective through-insert (e.g., through-insert 92). Second plate 60 may include opening 84 formed through second plate 60, which may provide access to cut-out 80 formed through second surface 54 and into at least a portion of core 56 of sandwich panel 48. Such opening 84 and cut-out 80 may be configured to receive a power component (e.g., power component 82), for use with personal electronic device 74 on the other side of mounting system 12 (e.g., adjacent first plate 58).

Figures 8, 9:
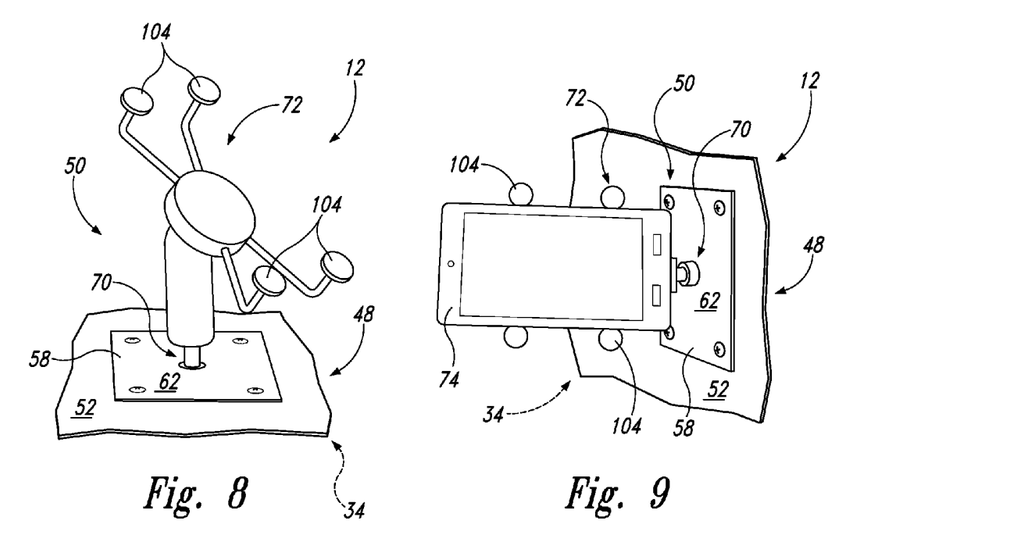
FIG. 8 is a perspective view of one example of a first plate of a mounting system according to the present disclosure, having a mounting accessory coupled thereto.
FIG. 9 is a perspective view of one example of a first plate of a mounting system according to the present disclosure, having a personal electronic device coupled thereto.

FIG. 8 shows an example of first plate 58 of mounting system 12, with mounting accessory 72 coupled to structural interface 70. Mounting accessory 72 may be selectively removable from structural interface 70 such that mounting accessory 72 may be removed and replaced with a different respective mounting accessory, as desired. Mounting accessory 72 may be movable with respect to structural interface 70, first plate 58, and first surface 52 of sandwich panel 48, such that a user may adjust the position and/or orientation of a personal electronic device coupled to or held by mounting accessory 72. For example, mounting accessory 72 may be configured to selectively tilt, rotate, hinge, and/or otherwise articulate so that a user may move mounting accessory 72 to a desired position or orientation, for suitable placement of a personal electronic device. Mounting accessory 72 may be configured to substantially retain its position and/or orientation with respect to first plate 58, until again moved by a user. In some examples, mounting accessory 72 may be a commercially-available, off-the-shelf mounting accessory, with which presently disclosed mounting systems 12 may be adapted or configured for use. Mounting accessory 72 may be adaptable to receive a variety of different types or sizes of personal electronic devices. For example, mounting accessory 72 may include an adjustable bracket or one or more adjustable arms 104 that may be selectively moveable and/or extendable, so as to receive different sizes of personal electronic devices.

FIG. 9 shows an example of a presently disclosed mounting system, having a representative personal electronic device 74 coupled thereto. Adjustable arms 104 of mounting accessory 72 are shown cradling personal electronic device 74. The position and/or orientation of personal electronic device 74 may be selectively adjustable with respect to first surface 52 of sandwich panel 48, via mounting accessory 72 and structural interface 70 of mounting system 12. As mounted, mounting system 12 may provide a secure means for mounting personal electronic device 74 for hands-free use during a flight. For example, such mounting systems 12 may be installed within a crew rest area of an aircraft (e.g., crew rest 24), such that crew members may use their own personal devices for entertainment during the flight, without relying on on-board entertainment systems. Mounting systems 12 may be configured to allow ergonomically advantageous positioning of users' personal electronic devices 74 and may provide a universal mounting, such that different users may subsequently use the same mounting system 12 with different types of personal electronic devices 74. Presently disclosed mounting systems 12 may be configured to provide a robust solution for supporting various, unknown loads, in order to secure various personal electronic devices 74 during a flight. While such mounting systems 12 may have particular utility on aircraft, they may be employed anywhere that a personal electronic device is desired to be mounted, such as in a car, on a boat, or within a building or other structure.

Figure 10:
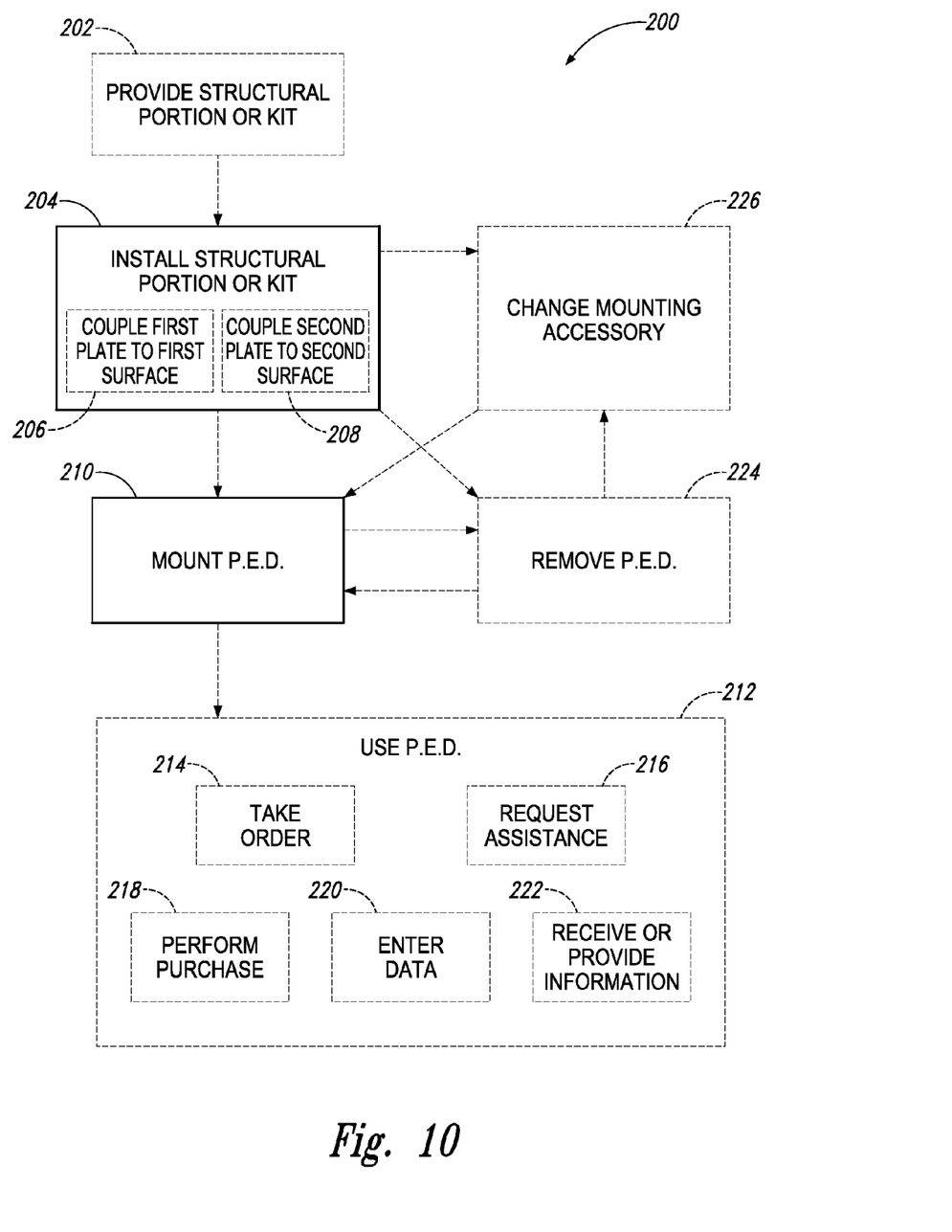
FIG. 10 is a schematic flow chart diagram, representing methods according to the present disclosure.

FIG. 10 schematically provides a flowchart that represents illustrative, non-exclusive examples of methods 200 according to the present disclosure. In FIG. 10, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 10 are not limiting and other methods and steps are within the scope of the present disclosure, including methods having greater than or fewer than the number of steps illustrated, as understood from the discussions herein.

Methods 200 may include providing one or more structural portions of one or more mounting systems (e.g., structural portion 50 of mounting system 12 and/or family of mounting systems 102) and/or providing a kit (e.g., kit 100) at 202. The kit or structural portion may be installed at 204, such as into a personal space of an aircraft (e.g., personal space 14 of aircraft 10). For example, a first plate of the kit or structural portion (e.g., first plate 58) may be coupled to a first surface (e.g., first surface 52 of sandwich panel 48 or interior monument 34) at 206, and a second plate of the kit or mounting system (e.g., second plate 60) may be coupled to a second surface (e.g., second surface 54 of sandwich panel 48 or interior monument 34) at 208. In some methods 200, installing the structural portion or kit at 204 may include installing a plurality of structural portions or a plurality of first plates and second plates. For example, one or more structural portions may be installed in a crew rest area of the aircraft, one or more structural portions may be installed in a galley area of the aircraft, and/or one or more structural portions may be installed in a cockpit of the aircraft. In some methods 200, installing the structural portion or kit at 204 may include inserting respective fasteners through the first plate, through a respective through-insert, and into a floating nut plate of the second plate, to secure the first plate and the second plate with respect to each other, on either side of a wall or other interior monument.

Methods 200 may include mounting a personal electronic device (e.g., personal electronic device 74, which may be abbreviated as "P.E.D.") at 210. For example, mounting the P.E.D. at 210 may include coupling the P.E.D. to a mounting accessory (e.g., mounting accessory 72) of the mounting system (e.g., structural portion 50 of mounting system 12). Methods 200 may further include using the P.E.D. at 212 while it is mounted in the mounting system. For example, using the P.E.D. at 212 may include using the P.E.D. for entertainment (e.g., watching a video, listening to music, playing a game, and/or browsing the internet), such as by a crew member during a flight. Additionally or alternatively, using the P.E.D. at 212 may include using the P.E.D. to perform a service function, such as taking an order from a passenger at 214, requesting assistance from a crew member and/or receiving such a request for assistance at 216, performing an in-flight purchase at 218, entering data to be stored on the P.E.D. at 220, and/or receiving and/or providing information at 222. Receiving and/or providing information at 222 may include providing information to a crew member and/or providing information to a passenger, using the P.E.D.

In some methods, the mounting accessory and/or P.E.D. may be removed from the mounting system and replaced with a different mounting accessory and/or P.E.D. For example, methods 200 may include removing the P.E.D. at 224, after which the user may simply take the P.E.D. away from the mounting system, and/or that user or a different user may mount a P.E.D. at 210, such as a different P.E.D. Between removing the P.E.D. at 224 and mounting a different P.E.D. at 210, some methods 200 may include changing the mounting accessory at 226. For example, changing the mounting accessory at 226 may include removing the current mounting accessory from the structural portion of the mounting system, and coupling a different mounting accessory to the structural portion of the mounting system.

As used herein, the terms "selective" and "selectively," when modifying an action, movement, configuration, or other activity of one or more components or characteristics of an apparatus and/or system, mean that the specific action, movement, configuration, or other activity is a direct or indirect result of user manipulation of an aspect of, or one or more components of, the apparatus and/or system.

Illustrative, non-exclusive examples of inventive subject matter according to the present disclosure are described in the following enumerated paragraphs:

A1. A mounting system, comprising:
 a sandwich panel having a first surface, a second surface opposite the first surface, and a core extending between the first surface and the second surface; and
 a structural portion coupled to the sandwich panel, the structural portion comprising:
  a first plate having a first outer surface and a first inner surface opposite the first outer surface, the first plate being coupled to the first surface of the sandwich panel such that the first inner surface faces the first surface of the sandwich panel;
  a second plate having a second outer surface and a second inner surface opposite the second outer surface, the second plate being coupled to the second surface of the sandwich panel such that the second inner surface faces the second surface of the sandwich panel, wherein the second plate is coupled with respect to the first plate such that a portion of the sandwich panel is positioned therebetween; and
  a structural interface configured to receive a mounting accessory for a personal electronic device such that the mounting accessory is positioned adjacent the first plate.

A1.1. The mounting system of paragraph A1, wherein the structural interface is configured to receive the mounting accessory such that the mounting accessory is positioned adjacent the first outer surface of the first plate.

A1.2. The mounting system of any of paragraphs A1-A1.1, wherein the structural interface is formed integrally with the first plate.

A1.2.1. The mounting system of paragraph A1.2, wherein the first outer surface of the first plate is the structural interface.

A1.3. The mounting system of any of paragraphs A1-1.2.1, wherein the structural interface is coupled to the first plate.

A1.4. The mounting system of any of paragraphs A1-1.3, wherein the structural interface is coupled to the first outer surface of the first plate.

A1.5 The mounting system of any of paragraphs A1-A1.4, wherein the structural portion further comprises a plurality of floating nut plates coupled to or formed integrally with the second plate.

A1.6. The mounting system of any of paragraphs A1-A1.5, wherein the structural portion further comprises:
 a plurality of fasteners substantially fixing the first plate with respect to the second plate.

A1.7. The mounting system of paragraph A1.6, wherein the plurality of fasteners couples the first plate to the second plate.

A1.8. The mounting system of any of paragraphs A1.6-A1.7, further comprising a plurality of through-inserts extending through the core of the sandwich panel, wherein each respective fastener of the plurality of fasteners extends through a respective through-insert of the plurality of through-inserts.

A1.9. The mounting system of any of paragraphs A1.6-A1.8, wherein each respective fastener of the plurality of fasteners engages the first plate and the second plate.

A1.10. The mounting system of any of paragraphs A1.6-A1.9, wherein each respective fastener of the plurality of fasteners engages a respective floating nut plate of a/the plurality of floating nut plates.

A1.11. The mounting system of any of paragraphs A1.6-A1.10, wherein at least a first respective fastener of the plurality of fasteners couples the first plate to the first surface.

A1.12. The mounting system of any of paragraphs A1.6-A1.11, wherein at least a second respective fastener of the plurality of fasteners engages a respective floating nut plate of a/the plurality of floating nut plates, thereby coupling the second plate to the second surface.

A2. The mounting system of any of paragraphs A1-A1.12, wherein the structural interface is configured to receive a plurality of different types of mounting accessories for a plurality of different personal electronic devices.

A3. The mounting system of any of paragraphs A1-A2, wherein the structural interface projects from the first outer surface of the first plate of the structural portion.

A4. The mounting system of any of paragraphs A1-A2, wherein the structural interface comprises a spherical elastomeric knob.

A5. The mounting system of any of paragraphs A1-A2, wherein the structural interface comprises a base, a ball, a suction cup, a clamp, a screw, a clip, a base plate, a track, a groove, and/or a recess.

A5.1. The mounting system of any of paragraphs A1-A5, wherein the structural interface is coupled to the first outer surface of the first plate via a mounting floating nut plate coupled to the first plate.

A5.2. The mounting system of any of paragraphs A1-A5.1, wherein the structural interface is coupled to the first outer surface of the first plate via at least one fastener, an adhesive, a suction cup, a magnet, a drill plate, a base plate, a bolt, a track, and/or a snap fit.

A6. The mounting system of any of paragraphs A1-A5.2, further comprising the mounting accessory.

A7. The mounting system of paragraph A6, wherein the mounting accessory comprises an adjustable mounting arm.

A8. The mounting system of paragraph A6, wherein the mounting accessory comprises an adjustable mounting bracket.

A9. The mounting system of paragraph A6, wherein the mounting accessory comprises a mounting arm, a clamp, a holder, a cradle, a grip, a socket, a spring, and/or a tripod.

A9.1. The mounting system of any of paragraphs A1-A9, wherein the mounting accessory is configured to maintain the personal electronic device in a position suitable for use and/or viewing by a passenger and/or crew member.

A9.2. The mounting system of any of paragraphs A1-A9.1, wherein the mounting accessory comprises a fitted mounting accessory.

A9.3. The mounting system of any of paragraphs A1-A9.2, wherein the mounting accessory comprises an adjustable mounting accessory.

A9.4. The mounting system of any of paragraphs A1-A9.3, wherein the mounting accessory is movably coupled to the structural interface.

A9.5. The mounting system of paragraph A9.4, wherein the mounting accessory is coupled to the structural interface via one or more of a hinge, a ball-and-socket joint, a spring, a cord, a retractable cord, a screw, a pivot, a bearing, and a track.

A10. The mounting system of any of paragraphs A1-A9.5, further comprising the personal electronic device, the personal electronic device being coupled to the structural interface via the mounting accessory.

A11. The mounting system of paragraph A10, wherein the personal electronic device comprises one or more of a mobile telephone, a tablet, a laptop, a camera, an e-reader, a handheld computer game system, a portable media player, a smartphone, a personal digital assistant, a music player, a GPS device, and an MP3 player.

A12. The mounting system of any of paragraphs A1-A11, wherein the first plate is metallic.

A13. The mounting system of any of paragraphs A1-A12, wherein the first plate is polymeric.

A14. The mounting system of any of paragraphs A1-A13, wherein the second plate is metallic.

A15. The mounting system of any of paragraphs A1-A14, wherein the second plate is polymeric.

A16. The mounting system of any of paragraphs A1-A15, wherein the first outer surface of the first plate comprises a substantially smooth surface.

A17. The mounting system of any of paragraphs A1-A16, wherein the first outer surface of the first plate is configured to receive and retain a suction cup.

A18. The mounting system of any of paragraphs A1-A17, wherein the structural portion further comprises a charging interface, the charging interface being configured to charge the personal electronic device.

A19. The mounting system of paragraph A18, wherein the charging interface is positioned adjacent the structural interface.

A20. The mounting system of paragraph A18 or A19, wherein the charging interface is positioned on the first outer surface of the first plate.

A21. The mounting system of any of paragraphs A18-A20, wherein the charging interface comprises one or more of a USB port, a micro-USB port, a three-prong outlet, a two-prong outlet, a Lightning port, a wireless charging interface, a headphone jack, a dock connector port, and a portable digital media interface (PDMI) port.

A22. The mounting system of any of paragraphs A1-A21, wherein the sandwich panel comprises a honeycomb core sandwich panel.

A23. The mounting system of any of paragraphs A1-A22, wherein the first surface of the sandwich panel is an interior wall of a personal space of an aircraft.

A23.1. The mounting system of paragraph A23, wherein the personal space comprises one or more of a crew rest, a lavatory, a private suite, a galley area, a cockpit, and an area apart from a main cabin of the aircraft.

A24. The mounting system of any of paragraphs A1-A23.1, wherein the second surface of the sandwich panel is an exterior wall of a/the personal space of an/the aircraft.

A24.1. The mounting system of paragraph A24, wherein the personal space comprises one or more of a/the crew rest, a/the lavatory, a/the private suite, a/the galley area, a/the cockpit, and an/the area apart from a main cabin of the aircraft.

A25. The mounting system of any of paragraphs A1-A24.1, wherein the sandwich panel comprises a cut-out extending through at least a portion of the core, the cut-out being configured to receive a power component, the power component comprising one or more of a wire, a cable, a power supply, a current source, a voltage source, and a charger.

A26. The mounting system of paragraph A25, wherein the cut-out is formed from the second surface of the sandwich panel.

A27. The mounting system of any of paragraphs A1-A26, wherein the mounting system is configured such that the personal electronic device may be selectively electrically coupled to a/the power component via the first plate.

A28. The mounting system of any of paragraphs A1-A27, wherein the mounting system is configured such that the personal electronic device may be selectively electrically coupled to a/the power component via a/the charging interface.

A29. The mounting system of any of paragraphs A1-A28, wherein the sandwich panel is configured to form a portion of one or more of an aircraft cabin, a passenger service unit, a sidewall, a passenger seat, an aircraft closet, an aircraft galley, a rolling galley cart, a lavatory, a cockpit, and a crew rest.

A30. The mounting system of any of paragraphs A1-A29, wherein the second plate of the structural portion is a doubler bracket.

A31. The mounting system of any of paragraphs A1-A30, wherein the second plate comprises an opening configured to allow access to a/the cut-out formed in the core of the sandwich panel.

A32. The mounting system of any of paragraphs A1-A31, wherein each of a/the plurality of floating nut plates is formed integrally with the second plate.

A33. The mounting system of any of paragraphs A1-A32, wherein each of a/the plurality of fasteners is installed through the first plate, through a respective through-insert of the plurality of through-inserts, and into a respective floating nut plate of a/the plurality of floating nut plates.

A33.1. The mounting system of any of paragraphs A1-A33, wherein each of the plurality of fasteners extends through an entire thickness of the sandwich panel, from at least the first surface to the second surface and through the core.

A34. The mounting system of any of paragraphs A1-A33.1, wherein the plurality of through-inserts comprises at least two, at least three, at least four, at least five, at least six, at least seven, at least eight, at least nine, and/or at least ten through-inserts.

A35. The mounting system of any of paragraphs A1-A34, wherein the mounting system is configured to suspend the personal electronic device from the sandwich panel, thereby positioning the personal electronic device for use and securing it to the sandwich panel via the structural portion and the mounting accessory coupled thereto.

A36. The mounting system of any of paragraphs A1-A35, wherein the sandwich panel is a substantially vertical structure.

A37. The mounting system of any of paragraphs A1-A36, wherein the first plate is spaced apart a distance from the second plate when the structural portion is coupled to the sandwich panel, wherein the distance is measured between the first inner surface of the first plate and the second inner surface of the second plate, substantially perpendicularly to the first inner surface and the second inner surface.

A38. The mounting system of paragraph A37, wherein the distance is at least 0.10 inches (in), at least 0.25 in, at least 0.5 in, at least 0.75 in, at least 1 in, at least 1.5 in, at least 2 in, and/or greater than 2 in.

A39. The mounting system of any of paragraphs A1-A38, wherein the sandwich panel comprises a wall of a crew rest.

A40. The mounting system of paragraph A39, wherein the first surface of the sandwich panel comprises an interior wall surface of the wall of the crew rest and wherein the second surface of the sandwich panel comprises an exterior wall surface of the wall of the crew rest.

B1. A family of mounting systems, comprising:
a plurality of structural interfaces, each structural interface being configured to receive a respective mounting accessory for a personal electronic device;
a plurality of first plates, each first plate being configured to receive a respective structural interface from the plurality of structural interfaces; and
a plurality of second plates, each second plate being configured to be coupled with respect to a respective first plate of the plurality of first plates, such that the respective first plate and the respective second plate are positioned on either side of an interior monument within an aircraft;
wherein the plurality of structural interfaces comprises a plurality of different types of structural interfaces, each different type of structural interface differing in at least one of size, shape, and connectivity type from the other different types of structural interfaces.

B2. The family of mounting systems of paragraph B1, further comprising a plurality of different types of mounting accessories.

B3. The family of mounting systems of paragraph B2, wherein the plurality of different types structural interfaces comprises a respective type of structural interface corresponding to each respective type of mounting accessory of the plurality of different types of mounting accessories.

B4. The family of mounting systems of any of paragraphs B1-B3, wherein each of the plurality of first plates comprises at least one charging interface, the at least one charging interface being configured to charge the personal electronic device.

B4.1. The family of mounting systems of paragraph B4, wherein the plurality of first plates comprises a plurality of different types of first plates, each different type of first plate differing from the other different types of first plates in at least one of size, shape, charging interface, and configuration to receive the structural interface.

B5. The family of mounting systems of paragraph B4 or B4.1, wherein each respective charging interface is positioned adjacent a respective structural interface.

B6. The family of mounting systems of any of paragraphs B4-B5, wherein the charging interface comprises one or more of a USB port, a micro-USB port, a three-prong outlet, a two-prong outlet, a Lightning port, a wireless charging interface, a headphone jack, a dock connector port, and a portable digital media interface (PDMI) port.

B7. The family of mounting systems of any of paragraphs B4-B6, wherein at least some of the first plates of the plurality of first plates comprise a first charging interface and a second charging interface, the first charging interface being a different type of charging interface than the second charging interface.

C1. A kit for providing a mounting provision for a personal electronic device in an aircraft, the kit comprising:
a first plate having a first outer surface and a first inner surface opposite the first outer surface, the first plate being configured to be coupled to a first surface of an interior monument within the aircraft such that the first inner surface faces the first surface of the interior monument, the first plate comprising a plurality of through-holes formed therethrough;
a second plate having a second outer surface and a second inner surface opposite the second outer surface, the second plate being configured to be coupled to a second surface of the interior monument such that the second inner surface faces the second surface of the interior monument, wherein the second surface of the interior monument is opposite the first surface, and wherein the second plate is configured to be coupled to the first plate such that a portion of the interior monument is positioned therebetween; and
a structural interface configured to receive a mounting accessory for a personal electronic device such that the mounting accessory is positioned adjacent the first plate,
wherein the kit is configured to be installed in the aircraft such that the first plate and the second plate together are configured to support the mounting accessory and the personal electronic device, the kit thereby being configured to suspend the personal electronic device from the interior monument within the aircraft and position the personal electronic device for use.

C1.1 The kit of paragraph C1, further comprising:
a plurality of through-inserts, each through-insert being configured to receive a respective fastener therethrough and extend from the first surface of the interior monument to the second surface of the interior monument; and
a plurality of floating nut plates, each floating nut plate being configured to engage a respective fastener extending through a respective through-insert of the plurality of through-inserts.

C2. The kit of paragraph C1, further comprising the mounting accessory, the mounting accessory being configured to be coupled to the structural interface, the mounting accessory being configured to maintain the personal electronic device in a position relative to the interior monument, wherein the position is suitable for use and/or viewing by a passenger and/or crew member adjacent the interior monument.

C3. The kit of any of paragraphs C1-C2, further comprising a plurality of fasteners, each fastener being configured to be installed through the first plate, through a respective one of the plurality of through-inserts, and into a respective one of a/the plurality of floating nut plates, thereby securing the first plate and the second plate to the interior monument.

C4. The kit of any of paragraphs C1-C3, wherein at least some of a/the plurality of floating nut plates are formed integrally with the second plate.

C5. The kit of any of paragraphs C1-C4, wherein the second plate comprises an opening formed therethrough, the opening being configured to allow insertion of one or more of a wire, a cable, a power supply, and a charger therethrough.

C6. The kit of any of paragraphs C1-C5, wherein the structural interface comprises one or more of an elastomeric spherical knob, a base, a ball, a suction cup, a clamp, a screw, a clip, a base plate, a track, a groove, and a recess.

C7. The kit of any of paragraphs C1-C6, wherein the structural interface is configured to project outwardly from the first outer surface of the first plate when the structural interface is coupled to the first plate.

C8. The kit of any of paragraphs C1-C7, wherein the kit is configured to be installed on the interior monument.

C9. The kit of any of paragraphs C1-C8, wherein the interior monument comprises a substantially vertical surface to which the kit is configured to be coupled to.

C10. The kit of any of paragraphs C1-C9, wherein the interior monument comprises one or more of a crew rest wall, a galley, an aircraft cabin, a passenger service unit, a sidewall, a passenger seat, an aircraft closet, a rolling galley cart, a lavatory, and a cockpit of the aircraft.

C11. The kit of any of paragraphs C1-C10, wherein the interior monument comprises a sandwich panel, wherein a core extends between the first surface and the second surface of the interior monument, and wherein each of the plurality of through-inserts is configured to be positioned in the core of the sandwich panel when the kit is installed in the aircraft.

D1. An aircraft comprising one or more of the mounting systems of any of paragraphs A1-A40 installed therein.

D2. The aircraft of paragraph D1, wherein the one or more mounting systems are provided in or on one or more of a crew rest, a galley, an aircraft cabin, a passenger service unit, a sidewall, a passenger seat, an aircraft closet, a rolling galley cart, a lavatory, and a cockpit of the aircraft.

E1. An aircraft comprising one or more of the kits of any of paragraphs C1-C11 installed therein.

E2. The aircraft of paragraph E1, wherein the one or more kits are installed in or on one or more of a crew rest, a galley, an aircraft cabin, a passenger service unit, a sidewall, a passenger seat, an aircraft closet, a rolling galley cart, a lavatory, and a cockpit of the aircraft.

F1. A method, comprising:
providing one or more of: the structural portion of the mounting system of any of paragraphs A1-A40 and the kit of any of paragraphs C1-C11 in an aircraft;
coupling the first plate to the first surface; and
coupling the second plate to the second surface.

F1.1 The method of paragraph F1, further comprising mounting a personal electronic device in the structural portion of the mounting system and/or the kit.

F2. The method of paragraph F1.1, further comprising using the personal electronic device while it is mounted in the structural portion of the mounting system.

F3. The method of paragraph F2, wherein the using the personal electronic device comprises one or more of taking a passenger order, performing an in-flight purchase, requesting assistance from a crew member, receiving a request for assistance from a passenger, providing information to a passenger, providing information to a crew member, and entering data to be stored on the personal electronic device.

F4. The method of any of paragraphs F1.1-F3, further comprising removing the personal electronic device from the structural portion of the mounting system.

F5. The method of any of paragraphs F1-F4, further comprising removing the mounting accessory from the structural portion of the mounting system and changing the mounting accessory by coupling a different mounting accessory to the structural portion of the mounting system.

G1. Use of the mounting system of any of paragraphs A1-A40 to mount a personal electronic device to a sandwich panel.

H1. Use of the kit of any of paragraphs C1-C11 to outfit an aircraft with a mounting system for a personal electronic device.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and systems, and steps of methods disclosed herein are not required to all apparatuses, systems, and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus, system, or method. Accordingly, such inventive subject matter is not required to be associated with the specific apparatuses, systems, and methods that are expressly disclosed herein, and such inventive subject matter may find utility in apparatuses, systems, and/or methods that are not expressly disclosed herein.

The invention claimed is:

1. A mounting system, comprising:
   a sandwich panel having a first surface, a second surface opposite the first surface, and a core extending between the first surface and the second surface; and
   a structural portion coupled to the sandwich panel, the structural portion comprising:
      a first plate having a first outer surface and a first inner surface opposite the first outer surface, the first plate being coupled to the first surface of the sandwich panel such that the first inner surface faces the first surface of the sandwich panel; and
      a second plate having a second outer surface and a second inner surface opposite the second outer surface, the second plate being coupled to the second surface of the sandwich panel such that the second inner surface faces the second surface of the sandwich panel, wherein the second plate is coupled with respect to the first plate such that a portion of the sandwich panel is positioned therebetween; and
      a structural interface configured to receive a mounting accessory for a personal electronic device such that the mounting accessory is positioned adjacent the first plate.

2. The mounting system according to claim 1, wherein the structural portion further comprises:
   a plurality of floating nut plates;
   a plurality of fasteners substantially fixing the first plate with respect to the second plate, wherein at least a first respective fastener of the plurality of fasteners couples the first plate to the first surface, and wherein at least a second respective fastener of the plurality of fasteners engages a respective floating nut plate of the plurality of floating nut plates, thereby coupling the second plate to the second surface; and
   a plurality of through-inserts extending through the core of the sandwich panel, wherein each respective fastener of the plurality of fasteners extends through a respective through-insert of the plurality of through-inserts.

3. The mounting system according to claim 2, wherein each floating nut plate of the plurality of floating nut plates is formed integrally with the second plate.

4. The mounting system according to claim 2, wherein the each fastener of the plurality of fasteners is installed through the first plate, through a respective through-insert of the plurality of through-inserts, and into a respective floating nut plate of the plurality of floating nut plates.

5. The mounting system according to claim 1, wherein the structural interface is configured to receive a plurality of different types of mounting accessories for a plurality of different types of personal electronic devices, wherein the structural interface is configured such that each of the plurality of different types of mounting accessories is selectively removable from the structural interface and selectively replaceable with a different respective mounting accessory of the plurality of different types of mounting accessories.

6. The mounting system according to claim 1, further comprising the mounting accessory, wherein the mounting accessory is configured to maintain the personal electronic device in a position suitable for use by one or more of a passenger and a crew member.

7. The mounting system according to claim 1, wherein the structural portion further comprises a charging interface, the charging interface being configured to charge the personal electronic device.

8. The mounting system according to claim 1, wherein the sandwich panel comprises a honeycomb core sandwich panel, wherein the first surface of the sandwich panel is an interior wall of a personal space of an aircraft, and wherein the second surface of the sandwich panel is an exterior wall of the personal space of the aircraft.

9. The mounting system according to claim 1, wherein the sandwich panel comprises a cut-out extending through at least a portion of the core, the cut-out being configured to receive a power component, the power component comprising one or more of a wire, a cable, a power supply, and a charger.

10. The mounting system according to claim 1, wherein the sandwich panel forms a portion of one or more of a main cabin, a passenger service unit, a sidewall, a passenger seat, an aircraft closet, an aircraft galley, a rolling galley cart, a lavatory, a cockpit, and a crew rest.

11. The mounting system according to claim 1, wherein the mounting system is configured to suspend the personal electronic device from the sandwich panel, thereby positioning the personal electronic device for use and securing it to the sandwich panel via the structural portion and the mounting accessory coupled thereto.

12. The mounting system according to claim 1, wherein the structural interface comprises a plurality of structural interfaces, each structural interface being configured to receive a respective mounting accessory from a plurality of mounting accessories for a respective personal electronic device from a plurality of personal electronic devices, wherein the first plate comprises a plurality of first plates, each first plate being configured to receive a respective structural interface from the plurality of structural interfaces, wherein the second plate comprises a plurality of second plates, each second plate being configured to be coupled to a respective first plate of the plurality of first plates, such that the respective first plate and the respective second plate are positioned on either side of the sandwich panel, wherein the plurality of structural interfaces comprises a plurality of different types of structural interfaces, and wherein the plurality of first plates comprises a plurality of different types of first plates, the different types of first plates differing in at least one of size, shape, and type of structural interface.

13. The mounting system according to claim 12, wherein each first plate of the plurality of first plates comprises at least one charging interface, the at least one charging interface being configured to charge the respective personal electronic device.

14. A kit for mounting a personal electronic device in an aircraft, the kit comprising:
   a first plate having a first outer surface and a first inner surface opposite the first outer surface, the first plate being configured to be coupled to a first surface of an interior monument within the aircraft such that the first inner surface faces the first surface of the interior monument, the first plate comprising a plurality of through-holes formed therethrough;
   a second plate having a second outer surface and a second inner surface opposite the second outer surface, the second plate being configured to be coupled to a second surface of the interior monument such that the second inner surface faces the second surface of the interior monument, wherein the second surface of the interior monument is opposite the first surface;

a structural interface configured to receive a mounting accessory for a personal electronic device such that the mounting accessory is positioned adjacent the first plate;

a plurality of through-inserts each being configured to receive a respective fastener therethrough; and a plurality of floating nut plates, each of the plurality of floating nut plates being configured to engage a respective fastener when the respective fastener is positioned such that it extends through a respective through-insert of the plurality of through-inserts;

wherein the kit is configured to be installed in the aircraft such that the plurality of through-inserts are positioned such that they extend between the first surface of the interior monument and the second surface of the interior monument and such that a respective fastener extends through each respective through-insert and is engaged with a respect one of the plurality of floating nut plates, such that the kit is configured to support the mounting accessory and the personal electronic device, thereby being configured to suspend the personal electronic device from the interior monument within the aircraft and position the personal electronic device for use.

15. The kit according to claim 14, further comprising the mounting accessory, the mounting accessory being configured to be coupled to the structural interface, the mounting accessory being configured to maintain the personal electronic device in a position relative to the interior monument, wherein the position is suitable for use by one or more of a passenger and a crew member adjacent the interior monument.

16. The kit according to claim 14, further comprising a plurality of fasteners, each fastener being configured to be installed through the first plate, through a respective one of the plurality of through-inserts, and into a respective one of the plurality of floating nut plates, thereby securing the first plate and the second plate to the interior monument.

17. A method, comprising:
providing one or more structural portions of a mounting system in an aircraft, each of the one or more structural portions comprising:

a first plate having a first outer surface and a first inner surface opposite the first outer surface, the first plate being configured to be coupled to a first surface of a sandwich panel such that the first inner surface faces the first surface of the sandwich panel;

a second plate having a second outer surface and a second inner surface opposite the second outer surface, the second plate being configured to be coupled to a second surface of the sandwich panel such that the second inner surface faces the second surface of the sandwich panel; and a structural interface configured to receive a mounting accessory for a personal electronic device such that the mounting accessory is positioned adjacent the first plate;

coupling the first plate to the first surface of the sandwich panel, the sandwich panel forming a portion of a personal space within the aircraft; and coupling the second plate to the second surface of the sandwich panel.

18. The method according to claim 17, further comprising mounting a personal electronic device in the structural portion of the mounting system and using the personal electronic device while it is mounted in the structural portion of the mounting system, wherein the using the personal electronic device comprises one or more of taking a passenger order, performing an in-flight purchase, requesting assistance from a crew member, receiving a request for assistance from a passenger, providing information to a passenger, providing information to a crew member, and entering data to be stored on the personal electronic device.

19. The method according to claim 18, further comprising removing the mounting accessory from the structural portion of the mounting system and changing the mounting accessory by coupling a different mounting accessory to the structural portion of the mounting system.

20. The method according to claim 17, wherein the coupling the second plate to the second surface of the sandwich panel comprises inserting each respective fastener of a plurality of fasteners through a respective through-insert of a plurality of through-inserts positioned within a core of the sandwich panel, the core extending between the first surface and the second surface of the sandwich panel.

* * * * *